United States Patent [19]
Holt et al.

[11] 3,914,438
[45] Oct. 21, 1975

[54] NUTRIENT COMPOSITION AND METHOD FOR MAKING SAME

[76] Inventors: Lemmie C. Holt, Rte. 1, Box 310, Lakeland, Fla. 33803; Ernest Paul Hansen, 908 Pleasant View Drive, Storm Lake, Iowa 50588

[22] Filed: Oct. 3, 1973

[21] Appl. No.: 403,286

[52] U.S. Cl. .......................... 426/61; 426/41; 71/8; 71/11; 71/53; 71/64 A
[51] Int. Cl.² .................... A23C 21/00; C05F 11/08
[58] Field of Search ....... 71/1, 11, 22, 23, 27, 64 A, 71/64 D, 64 C, 64 E, 64 G, 64 F, 64 DB, 8, 85, 53; 426/41, 61

[56] References Cited
UNITED STATES PATENTS

| | | | |
|---|---|---|---|
| 3,062,637 | 11/1962 | Marples | 71/64 G |
| 3,305,491 | 2/1967 | Oster | 71/64 E |
| 3,485,641 | 12/1969 | Bundus | 426/41 |
| 3,497,359 | 2/1970 | Peer | 426/41 X |
| 3,536,471 | 10/1970 | Ashley | 71/8 |
| 3,567,460 | 3/1971 | McCoy | 71/11 X |
| 3,580,715 | 5/1971 | Dilday | 71/64 DB |

*Primary Examiner*—Frank A. Spear, Jr.
*Assistant Examiner*—Ferris Lander
*Attorney, Agent, or Firm*—Zarley, McKee, Thomte & Voorhees

[57] ABSTRACT

A nutrient composition for animals and plants comprising a natural whey product, fermented in the presence of cobalt ions in combination with a mineral mix, the particle size of the composition being less than 44 microns. The composition is produced preferably by employing a particle-to-particle impact size reduction technique which allows the majority of the particles to be a composite of both the whey and the mineral mix ingredient.

35 Claims, 3 Drawing Figures

U.S. Patent  Oct. 21, 1975  3,914,438
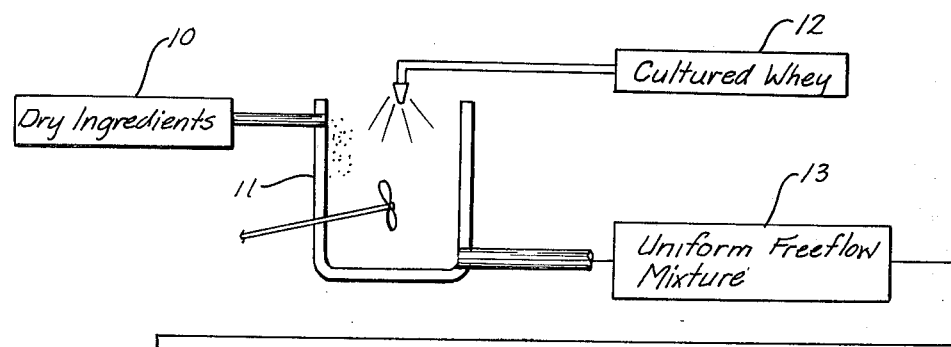
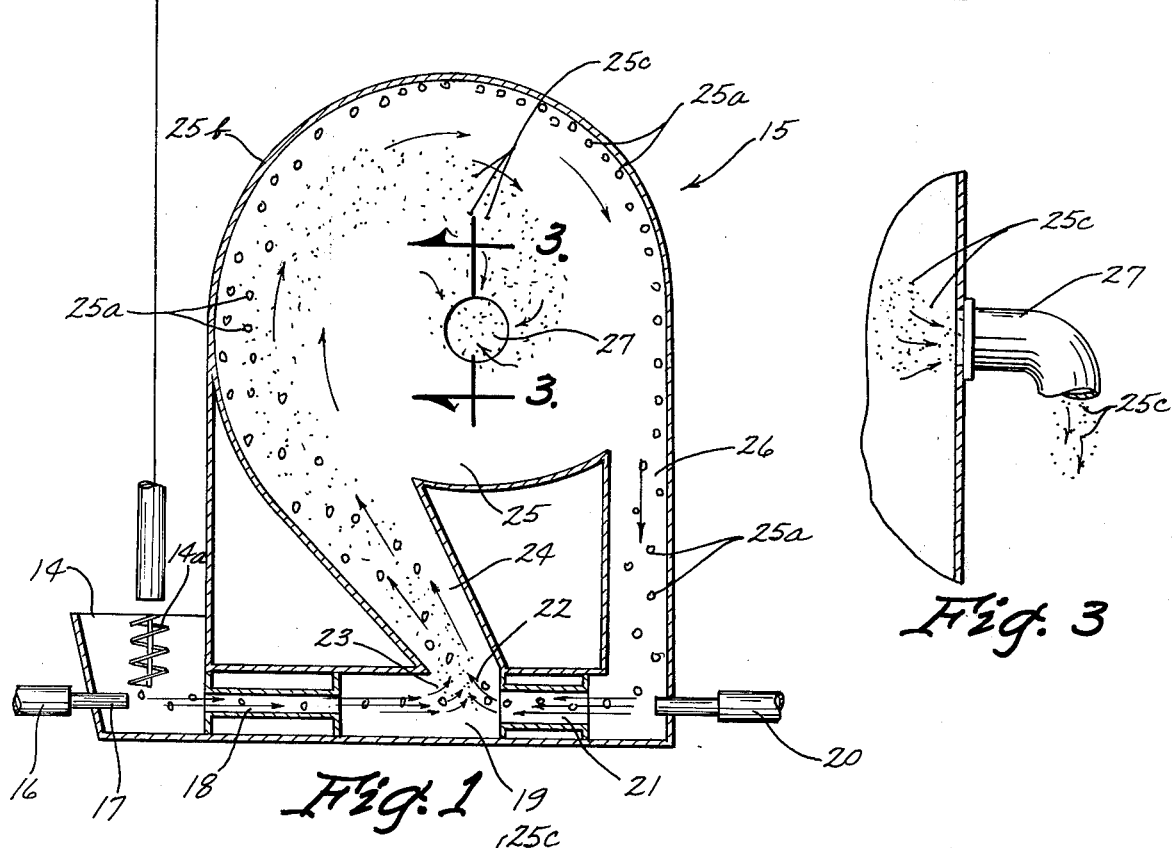
Fig. 1
Fig. 3
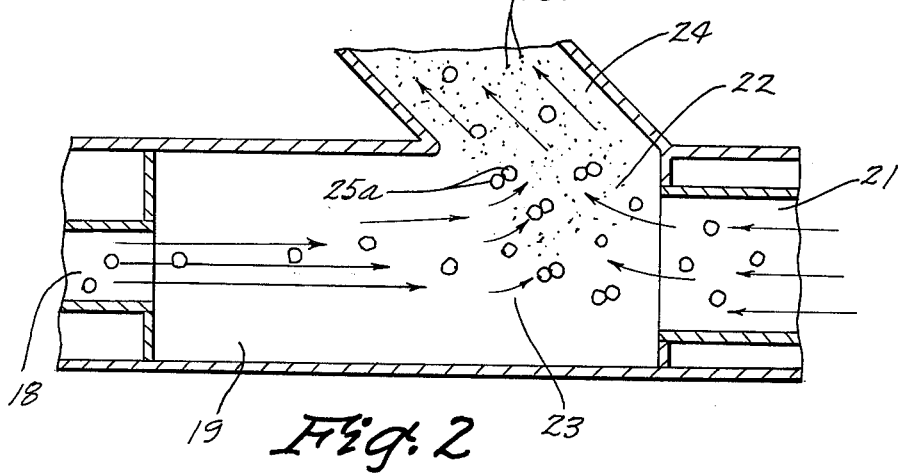
Fig. 2

3,914,438

NUTRIENT COMPOSITION AND METHOD FOR MAKING SAME

BACKGROUND OF THE INVENTION.

For many years people have known of the value of applying primary fertilizer sources to soil and to plants. Primary fertilizers sources as used herein refers to nitrogen, potassium and potash fertilizer sources often referred to in the art as N-P-K. In addition, the art has long known of the value of adding secondary fertilizer sources such as calcium, magnesium and sulphur to soil and/or plants. However, of more recent vintage, but still known in the art, there has been much publicity concerning the fact that good healthy plants in addition to primary and secondary fertilizers also need sources of trace elements. Trace elements, or minerals, the two terms being used herein interchangeably, refer generally to sources of copper, zinc, manganese, boron, sodium, cobalt, aluminum, iron, molybdenum, chromium, iodine, and in some cases magnesium is also referred to as a trace mineral. Proper balance of these trace minerals in plants has been found to be of vital importance from the standpoint of producing plants which are healthy, large and will produce good crop yields.

In spite of the fact that the nutritional value of these trace minerals has been known for some period of time, effective feeding programs for trace minerals have been difficult to obtain. Such difficulties arise because even though trace minerals are present in soil and other natural environmental food sources, those minerals are often not in the form available for utilization by the plant. For example, even though trace elements have been present and therefore should be available for nutrient needs it has been noted that such elements are not utilized by the plant where the soil is treated with a heavy liming program, where the soil has a high pH, where the soil has a high application rate of primary fertilizers, where the soil is very wet under usual spring conditions, where the soil has been heavily compacted, and the like. While it is not known for certain why these conditions as well as some others cause any trace minerals which are present to be unavailable for utilization by the plants, it is believed that the trace minerals are somehow tied up either by physical means or in some cases, by chemical bonding through chelating in such a manner that they do not become readily available for the plants.

Other of the trace elements, even though present and available and not physically tied up in manners heretofore described, will not reaily benefit the plants when applied because they refuse to easily mobilize within the plant and pass through the leaf into the vascular system of the plant down into the root zone and the fruiting areas of the plant where the most benefit from such trace minerals would be obtained. Thus while trace minerals may be applied, and indeed have been applied to plants in the past, their overall effectiveness in providing the benefit they are capable of providing to the plant has been greatly diminished either because of reluctance to mobilize in the plant and penetrate within the vascular system of the plant or because the particles are of such a great size that they are leached off the plant by water or blown off by wind.

In addition, certain forms of trace element sources which have been applied to plants in the past by means of foilage application, have been found to be phytotoxic to the plant. In other words, the concentration of the trace elements in the solution applied to the plants has been such that the foilage of the plant is burned which affects the fruiting capabilities of the plant, the chlorophyll building capabilities of the plant and, if carried to the ultimate extreme, can even kill the plant. This phyto-toxic effect has been found to exist even where very dilute concentrations of trace element solutions are applied to plants.

Accordingly, while it has been known that trace elements, if applied to plants, will provide great nutritional benefits resulting in healthier plants and larger crop yields, trace element application systems have met with less than total success because of the inherent difficulties in utilizing them effectively in a manner which will insure mobilization within the vascular system of the plant, and in a manner which is agronomically feasible, and in a manner which will insure the prevention of phyto-toxic affects on the plants, and finally, in a manner which will overcome the various effects caused by the soil which might tend to make the trace elements unavailable for use by plants.

Accordingly, it is an object of this invention to provide a nutrient composition which will provide sources of trace elements in a manner readily available for plant usage.

Another object of this invention is to provide trace element sources in a composition which will not be phyto-toxic to the plants.

Yet another object of this invention is to provide a trace element source composition which when applied to the plants will allow even the most difficult of trace elements to mobilize readily within the vascular system of the plant and provide trace element source to the fruiting areas and the root zone of the plant as well as the foilage.

Yet another object of this invention is to provide a source of trace elements to plants which will overcome any natural tendencies by the soil or other environmental surroundings to tie up and prevent availability of the trace elements either by physical tying of such elements or by chemical bonding through chelation.

Still another object of this invention is to provide a nutrient composition which comprises a cultured natural whey product which has been innoculated with lactobacillus organisms and fermented in the presence of cobalt ions, in combination with trace element mineral mixes, the particle size of said composition being less than 44 microns.

And, yet another object of this invention, is to provide a process for making the previously described nutrient composition.

The method of accomplishing these and other objects of this invention will be apparent from the following description of the invention.

BRIEF DESCRIPTION OF THE DRAWING.

FIG. 1 is a schematic illustration of the process of this invention using the preferred opposing jet air mill.

FIG. 2 is a more detailed, close-up view of the particle impact zone of the air mill shown in FIG. 1.

FIG. 3 is a view along line 3—3 of FIG. 1 showing the outlet at the rear of the air mill for properly sized particles of the nutrient composition of this invention.

SUMMARY OF THE INVENTION.

This invention relates to a nutrient composition, especially adapted for plants, but also available for usage for animals which generally comprises the combination of a cultured natural whey product which has been innoculated with lactobacillus organisms, and preferably lactobacillus acidophilus organisms, and fermented in the presence of cobalt ions, in combination with a mineral mix containing trace minerals, the particle size of the particles of the composition being less than 44 microns. The invention also relates to a process of preparing such a nutrient composition in a manner employing particle-to-particle impact size reduction so that the majority of the particles present each contain some of the whey product and some of the mineral mix.

The resulting nutrient composition provides a readily available source of trace elements which can in an agronomically effective manner be utilized to provide sources of trace elements for plants. The trace elements, because of the combination of ingredients in conjunction with the particle size are present in a form which will insure good mobilization of the trace elements within the vascular system of the plant and further insure that the trace elements will be available even though soil conditions might be generally adverse to the availability of trace elements for nutrient plant feeding.

DETAILED DESCRIPTION OF THE INVENTION.

The nutrient composition of this invention comprises two essential ingredients which after combination have been sized reduced by particle-to-particle impact size reduction to a particle size of less than 44 microns. The importance of the size reduction manner and technique will be described hereinafter. The two essential ingredients are a fermented natural whey product comprising generally from about 3% to about 30% by weight of the nutrient composition and preferably from about 3% to about 15% by weight of the nutrient composition and a trace mineral mix generally comprising from about 1% to about 97% by weight of the nutrient composition and preferably comprising from about 3% to about 25% by weight of the nutrient composition.

Natural wheys are well known. Sources of whey include conventional dairy milk and soy milk. With specific regard to dairy milk, whey can generally be thought of as a milk serum separating as a watery liquid after milk coagulation in the making of cheese or cheese-like products. The whey which is useful in preparing the nutrient composition of this invention is natural whey which has been innoculated with lactobacillus organisms, and fermented in the presence of cobalt ions. Examples of such lactobacillus organisms include lactobacillus bulgaricus and lactobacillus acidophilus. The most preferred lactobacillus organism from the standpoint of the results obtained is lactobacillus acidophilus.

After innoculation of the whey product with the lactobacillus organism the whey is placed in fermenting conditions and allowed to ferment in the presence of cobalt ions. The source of cobalt ions can be any convenient source of cobalt such as cobalt carbonate, cobalt sulfate, cobalt lactate, cobalt chloride, cobalt acetate, and cobalt nitrate. The preferred source of cobalt ions is cobalt carbonate. The amount of cobalt ions source used is preferably from five parts per million, hereinafter abbreviated as p.p.m., to 1000 parts per million with 80 p.p.m. to 120 p.p.m. being especially preferred. However, other amounts of cobalt either below or above these practical ranges given herein can be employed without departing from the spirit and scope of this invention. Thus the ranges presented herein are merely practical and permissive ranges for cobalt.

A complete description of preparation of a fermented milk whey product which has been prepared by innoculating with lactobacillus organisms and fermenting in the presence of cobalt ions is given in Peer, U.S. Pat. No. 3,497,359, issued Feb. 24, 1970 and assigned to Fermo Gro Corporation. The entire disclosure of that patent relating to the making of fermented whey products which have been innoculated with lactobacillus organisms and fermented in the presence of cobalt ions is incorporated herein by reference. However, for the sake of clarity of description a brief description of such a process will be provided herein. A whey starter micro organism is prepared by developing an initial culture of lactobacillus organism treated with a source of cobalt ions. For example, skim milk (500 ml.) can be treated with 50 milograms of cobalt carbonate (100 p.p.m.) and sterilized by putting the solution in a flask and placing the flask in an autoclave for 20 minutes at 5 p.s.i. This sterile milk solution is cooled to 78°F. and innoculated with 2 grams of commercial dry lactobacillus acidophilus and then incubated at 100° for 24 hours.

This initial culture can then be utilized for making stock cultures by adding portions of the initial stock culture to skim milk to which has been added a portion for example 100 millimeter sample of skim milk might have 10 milograms of cobalt carbonate added thereto, with the resulting new stock culture being autoclaved for 20 minutes at 5 p.s.i. Of course, the initial culture can be utilized to prepare a plurality of stock cultures.

The stock cultures are then innoculated at 100°F. for 24 hours to develop their bacterial density.

After preparing stock cultures these stock cultures are utilized to innoculate other whey samples which are allowed to ferment at temperatures of 100°F. for approximately 24 hours to provide a culture having an organism density of 150 to 200 million organisms per millimeter.

For further details of the continuing preparing of larger and larger cultures by innoculating those cultures with smaller cultures, see the previously incorporated herein by reference patent Peer, 3,497,359. The resulting product of this process is a natural whey product which has been innoculated with lactobacillus organism, preferably lactobacillus acidophilus, to which a source of cobalt ions has been added, with the entire mixture being fermented at conditions generally of about 100°F. to allow the micro organism to grow and reproduce. The final result is a whey product which has been fermented and contains lactobacillus organisms which because of the presence of cobalt ions have developed a high resistance to high acidity and will therefore not die upon immediate contact with highly acid environment. This cultured whey product, unless dried, is in liquid form.

Turning now to a description of the second essential ingredient of the nutrient composition which is the trace mineral mix. As heretofore briefly stated the trace mineral mix can generally comprise from about 1% to about 97% by weight of the nutrient composition but preferably comprises from 3% by weight to about 25% by weight of the nutrient composition. Of course, the precise formulation of the trace mineral mix ingredient can vary and indeed will vary depending upon the particular deficiencies of the plants to which the nutrient composition is to be added. For example, the most precise determination of trace element nutrient deficiency is through tissue analysis of very young plants. If tissue analysis of such plants shows that they are deficient in zinc, manganese, copper and magnesium, the trace element mineral mix would be formulated to specifically make up for those deficiencies. In addition, the precise trace mineral mix formulation would be dictated to some extent by an analysis of the soil condition and composition in the geographic area to which the nutrient composition is to be applied. Thus, for example, if the soil conditions were such that the analysis showed a marked deficiency of iron, iron would be added as one of the trace elements.

The trace mineral mix can, however, contain any of the trace minerals generally important to plants and often deficient in the diet of crop plants. These trace minerals are generally copper, zinc, manganese, boron, sodium, cobalt, aluminum, iron, molybdenum, chromium, iodine, magnesium, and in some cases, calcium and sulphur, even though calcium and sulphur are traditionally characterized as secondary fertilizers.

The source of trace elements within the trace mineral mix ingredient from the nutrient composition of this invention can vary widely. Generally, however, the source of trace elements will be both water soluble and water insoluble salts of the trace elements. For example, the salts can be oxides, carbonates, sulfates, chlorides, nitrates and the like. However, it should be noted that organic chelates of the trace minerals and other organic sources of the trace minerals can also be utilized.

The trace mineral ingredient of the trace mineral mix will generally comprise from about 1% by weight to about 15% by weight of the trace mineral sources. The remaining portion of the trace mineral mix ingredient will comprise clays, dispisants, wetting agents and surfactants or mixtures thereof.

The clay merely functions as a convenient carrier for the trace mineral source. Such clays are well known in the fertilizer industry and such carrier clays can include conditioning clays, kalonites, attapulgate, montmarilainit, and bentonite. Of course, other clays can also be utilized if desired.

If desired, well known wetting agents and sufactants can be added to provide desirable surface activity characteristics. When added, wetting agents and surfactants should be added in generally small amounts from about 1% to about 5% of the trace mineral mix ingredient.

While not absolutely essential it is strongly preferred that the mineral mix contain, in addition to the trace mineral source, and a carrier clay, from about 0.1% to about 10% by weight of the mineral mix ingredient of an anionic dispersant. Such an anionic dispersant is preferred to be present because, as explained in more detail hereinafter, once particle size reduction has been completed, the anionic charge of the dispersant will uniformly charge the small particles of the nutrient ingredient composition with an anionic charge thereby insuring that the particles will naturally repel each other and be prevented from coalescing by means of electrical attraction between opposing charges. The anionic dispersant, where one is employed, can be a natural anionic dispersant or a synthetic anionic dispersant or a combination of both. Preferred natural anionic dispersants are calcium, lignosulfonate and sodium lignosulfonate. Preferred synthetic dispersants are Petro-Sperse-P and Tamol or mixtures thereof. Petro-Sperse-P is the trademark for a synthetic dispersant sold by Petro Chemicals Inc. and Tamol is a trademark of a synthetic dispersant sold by Roman Haas & Co.

As should be obvious from the description given herein, the mineral mix ingredient is a solid material.

Of course, as explained in some greater detail hereinafter, additional materials can be included in the nutrient composition such as primary and secondary fertilizers and liquid carriers where the ultimate product is to be a liquid nutrient suitable for spray application or the like.

More detail will be presented hereinafter with regard to the manner of mixing the whey product and the mineral mix to provide the ultimate nutrient composition, however, it should be noted that particle size forms an important part of the nutrient composition of this invention. Particles of the resulting nutrient composition should have a particle size of less than 44 microns. Preferably the particle size is less than 20 microns and most preferably the particle size is from one micron to 15 microns. Even sub-micron sized particles can be utilized.

The importance of particle size of the nutrient composition is known but the prescise reason as to why it is important is not specifically known. while not wishing to be bound by any theory, it is believed that particle size is important in order to insure good mobility of the nutrient composition within the vascular system of the plants. Larger particles, generally those greater than 44 microns in width or diameter, have difficulty mobilizing within the vascular system of plants. In addition, such larger particles can be easily washed off by rain, or blown off by wind. Finally, larger particles have a greater tendency to induce the previously described phyto-toxic affect whereby the plant foilage is burned and the plant is seriously harmed.

Reference has previously been made to the importance of particle size to prevent certain undesirable side affects and to insure mobilization of the trace elements within the vascular system of the plant so that the plant will obtain the benefit of the trace elements; however, in addition to particle size the characteristics of the individual particles of the nutrient composition are also important. The particles are not simply a random mixture of whey particles and trace mineral mix particles which would be obtained by size reducing each and then mixing the particles together by conventional mixing means. Rather, the particles themselves are simultaneously size reduced in such a manner that a substantial portion of the particles each comprise some portion of the whey ingredient and some portion of the trace mineral mix ingredient. Preferably, substantially all of the particles comprise individually some portion of the whey ingredient and some portion of the mineral mix ingredient.

The individual particles of the nutrient composition are formed into composites comprising some portion of each ingredient by what is believed to be a physical uniting of the ingredients during size reduction to the desired particle size. This physical unity of the two components, i.e., the whey product and the trace mineral mix ingredient, is accomplished by utilizing particle-to-particle impact size reduction methods. In other words, the desired particle size is obtained by size reduction induced by forcing collisions of the particles so that they smash against one another and either smear portions of each on the other or are physically embedded one on the other. More detail will be presented hereinafter with regard to various methods of particle-to-particle impact size reduction techniques.

Turning now to the process of this invention, which, for purposes of clarity, will be described with continuing reference to the drawing. With regard to the process description it is important to note that the whey product is a liquid and the mineral mix ingredient is a solid.

Speaking in the broadest sense the process generally comprises the following: All of the dry mix ingredients, which includes the entire trace mineral mix composition, is blended together in a conventional blender which can be a conventional mixing device such as a ribbon blender or the like. After a reasonable degree of mixing such that an appearance of homogeneity is obtained the liquid cultured whey product is sprayed on the dry mix ingredients while continually mixing. Mixing is continued until the combination of liquid cultured whey ingredient and the remaining dry ingredients has a uniform dry free-flowing appearance. Generally this can be accomplished within about ten minutes at 50 rpm's mixing. The resulting dry uniform free-flowing mixture is then milled by particle-to-particle impact milling means to provide particles of less than 44 micron size which, because they have been reduced by particle-to-particle impact, generally are characterized by each particle containing some portion of the whey ingredient and some portion of the trace mineral mix ingredient.

Particle-to-particle impact size reduction is known in the art. It can be accomplished by air milling, fluid energy milling, utilization of Raymond mills, pin mills and the like. A preferred means of air milling is by opposed jet air milling which will be described in more detail hereinafter. In addition, see Perry's Handbook of Chemical Engineering, 3rd Edition, whose disclosure of air milling is incorporated herein by reference.

With continuing reference to the drawing, the dry ingredients are placed in a conventional mixer 11 and mixed therein until a general appearance of homogeneity appears. The dry ingredients 10 include the entire composition of the trace mineral mix which is comprised of the source of trace minerals, a carrier clay, anionic dispersing agents, if they are employed, wetting agents if they are employed, surfactant agents if they are employed, and where it is desired, portions of primary and secondary fertilizers. The dry ingredients 10 are subjected to additional mixing at like conditions after the appearance of homogeneity is obtained. While continued mixing is occurring in mixer 11 the cultured whey ingredient 12 is sprayed on the mixing dry ingredients 10. At first an appearance of wet agglomerates is obtained, however, after continuing mixing all moisture is absorbed into the dry ingredients and the product obtains a dry free-flowing appearance without a substantial portion of large agglomerates. The resulting mix after mixing dry ingredients 10 and cultured whey 12 to obtain a uniform and free-flow mixture is referred to in the drawing as 13. The uniform free-flow mixture 13 is now ready for size reduction by particle-particle impact size reduction means to obtain the desired particle characteristics and size. The uniform mixture is fed into hopper 14 of an opposing jet air mill generally referred to at 15.

Opposing jet air mill 15 comprises a first jet 16 in communication with the uniform free-flow mixture 13 being fed through hopper 14, usually by an auger conveyor means, depicted herein as 14a. Air jet 16 is in communication with a source of compressed air, not shown, which passes through nozzle 17 to provide high velocity air movement into conduit member 18 and chamber 19. The uniform dry mix 13 is carried along by the high air velocity through the conduit 18 into chamber 19.

Opposing jet 20 is of similar construction to jet 16 and will therefore not be described in detail. Compressed air from jet 20 is released into conduit 21, which has a larger diameter than conduit 18, and thereafter is also released into chamber 19. Because conduit 21 has a larger diameter than conduit 18 the mass of air released into chamber 19 from jet 20 will be greater than the mass of air released into chamber 19 from jet 16. The opposing air forces will collide in chamber 19, as depicted at 22 and 23.

Upstack 24 is in communication with housing chamber 25 and chamber 19. Housing chamber 25 is generally circular in cross section. Particles of uniform free-flow mixture 13 will be size reduced by the collisions resulting in chamber 19. The particles along with air will pass into upstack 24 and into housing chamber 25. Air flow in housing chamber 25 will be rotational like the air flow in a cyclone. Larger particles 25a will be flung to the interior wall 25b of housing chamber 25 by centrifugal force and circle around to downstack 26 wherein they will be recycled and impacted with other incoming particles. Smaller particles 25c will be less affected by centrifugal force and will migrate towards the vortex of the circular air movement in housing chamber 25 and can be carried away through an outlet 27 in the back wall of housing chamber 25 for subsequent packaging and shipment.

Many variables exist in the operation of such an opposing jet air mill. For example, nozzle size is important, the dimensions of conduit members 18 and 21 are important, and, of course, the pressure and amount of air introduced into chamber 19 is important. However, satisfactory results with an attendant particle size reduction to less than 44 microns can be achieved by operating an opposing jet air mill as described utilizing nozzle pressures of from about 100 to 110 pounds per square inch, a particle feed rate of from about 1000 to about 3000 pounds per hour and an air feed rate of 1000 cubic feet per minute.

As can be from the from the above description the particles of the nutrient composition of this invention are size reduced by inducing collision of particles. The particles when they collide are traveling at a high velocity in generally opposing directions and as a result each particle has a tendency to be physically united with the particle with which it collides. This physical unity could be an embedding operation wherein very small particles are embedded in larger particles or it could be a physical smearing operation. But in any event, the particles are united in some manner so that the resulting particles of the desired less than 44 micron particle size are substantially characterized in that each particle contains a portion of the whey ingredient and a portion of the trace mineral ingredient.

The resulting composition has a general texture of cosmetic face powder.

The resulting combination of this invention is far superior to either ingredient alone as a nutrient composition. It is believed that this is so because the smallness of the particles increases the surface area for active exposure to plants and their vascular system. In addition, each particle contains some of the other particles and the cooperative effect is such that a very effective nutrient is obtained. Surprisingly, if the trace mineral ingredient alone is reduced to the particle size as specified herein and if the cultured whey product is dried and alone reduced to the particle sizes mentioned herein, the result is not an effective nutrient composition. This is true even though the ingredients be physically mixed after size reduction. Thus, as can be seen the resulting composite formed by the combination of the ingredients of this invention provides an effective result that neither alone will provide or both when combined without utilizing particle size reduction means which provide particle-to-particle impact which in turn provides some physical unity between the components of the nutrient composition of this invention. It can thus be seen that an unexpected result is provided not obtainable by utilization of the ingredients separately or in conventional mixtures.

The following examples are offered to further illustrate but not limit the invention disclosed herein.

In this regard it should be readily apparent to those skilled in the art that some changes may be made in the preparation of the composition of this invention without departing from the real spirit and purpose of the invention. The claims of this invention cover any reasonable modified equivalents which may be included within the scope thereof.

EXAMPLE

(Preparation of Cultured Whey, 12)

Five hundred ml. of grade A skim milk is combined with 50 milligrams of $CoCO_3$ and sterilized in an autoclave for 20 minutes at 5 p.s.i. The sterile milk is cooled to 78°F, innoculated with 2 grams of commercial dried (dri-vac) *Lactobaccilus acidophilus* and incubated for 24 hours at 100°F. This initial stock then has a live organism density of 150 to 200 million organisms/ml.

Additional stock cultures are prepared from this initial culture by innoculating additional 100 ml. skim milk samples with 10 ml. of the initial culture and repeating the sterilization and incubation procedure. This procedure is repeated until a desired quantity culture of innoculated skim milk, which has been fermented in the presence of cobalt ions has been obtained. For further details see U.S. Pat. No. 3,497,359, issued Feb. 24, 1970 which has previously been incorporated herein by reference. This inventory is the starter material for additional preparations. Dried natural milk whey and water are mixed at a weight ratio 1:23 of whey to water $CoCO_3$ was added at a ratio of 65 p.p.m. and ammonium hydrogen phosphate was added at 400 p.p.m. in order to control ph. This mixture was heated to 100°F. and innoculated with stock culture prepared as previously described. The amount of stock culture used varied but was within the range of 1% to 4% by weight of total mixture. The innoculated mixture was allowed to ferment at 100°F. until a ph value within the range of 3.8 to 4.1 was obtained.

Thereafter nutrients are added to the mixture in accord with the procedure shown at Col. 4 1 1 71 through Col. 5 1 58 of U.S. Pat. No. 3,497,359, which is incorporated herein by reference. The nutrient supplemented composition will have a percentage of solid of about 17–20%.

Next, 25% by weight of $CoCO_3$ is added and mixed with the nutrient supplemented composition and 0.75% by weight of ferrous lactate is added and blended until thoroughly mixed. The result is a liquid, cultured whey product which has been fermented in the presence of cobalt ions, and innoculated with *Lactobacillus acidophilus* organisms. The orgamisms have developed a resistance to high acidity. This product will hereinafter be referred to herein as cultured whey, 12, and forms one ingredient of the present invention.

Thus cultured whey, 12, as used herein refers to a lactic acid fermentation product produced by fermenting a milk nutrient media with lactobicillus organisms, preferably lactobacillus acidophilus organism, in the presence of cobalt ions.

A similar but less preferred cultured whey product can be prepared when the lactobacillus organism is *Lactobacillus bulgaricus*. Likewise, similar results are obtained when other cobalt salts are substituted for cobalt carbonate, for example, cobalt chloride, cobalt sulfate, cobalt nitrate, cobalt lactate, cobalt acetate and other similar salts of cobalt and common anions.

(Preparation of Trace Element Mineral Mixture and Mixing Dry Ingredients)

A trace element mineral mix is prepared comprising water soluble salts of zinc, manganese, iron and magnesium. Additionally, the mix comprised calcium salts as a secondary fertilizer and sulphur in the form of elemental sulfur, as a primary fertilizer. Additional ingredients of the dry ingredient mixture included kalonite as a carrier clay, natural anionic dispersant. The composition of the dry ingredients on a weight basis is as follows:

| Ingredient | Percentage by Weight |
| --- | --- |
| Trace element ingredient | 15 |
| Secondary fertilizer | 15 |
| Primary fertilizer | 10 |
| Carrier clay | balance |
| Natural anionic dispersant | 2 |

All of the dry ingredients 10, were mixed in mixer 11 for 10 minutes at 50 r.p.m. to provide a uniform free-flow appearance. Thereafter, while continuing to mix the dry ingredients cultured whey 12 was sprayed on the mixing dry ingredients and mixing was continued until a uniform free-flow mixture 13 was obtained.

The total weight of the dry ingredient mixture was 3 pounds. The total weight of cultured whey, 12, sprayed thereon was 4 ounces. Mixture 13 was fed into opposing jet air mill 15 which was operating as previously described. The nozzle pressure employed was 110 p.s.i., the air feed rate was 1000 cubic feet per minute and the feed rate of mixture 13 into opposing jet air mill 15 corresponded to a rate of 1000 pounds per hour. Substantially all of the resulting particles were each comprised of some portion of cultured whey 12 and some portion of trace element mix. They had an average particle size of about 2 microns. All of the particles were less than 44 microns in size. The resulting nutrient composition had the appearance of talcom powder.

Additional samples of product are made in the manner described above varying only in the trace element formulation employed, and the quantities of ingredients. In particular other samples are made employing salts of copper, boron, cobalt, aluminum, molybdenum, chromium and iodine as the trace elements.

The anionic dispersant employed is also varied to make a nutrient composition using synthetic anionic dispersants and in particular Petro-Sperse-P and Tamol.

The nutrient composition prepared in this example, and larger quantities thereof identically prepared is utilized to prepare a foliar application comprising 8 pounds of nutrient composition per 20 gallons of water. This foliar application is sprayed on several thousand acres of growing strawberries, tomatoes, peppers, sugar beets, lemons and oranges. The plant growth and crop yield is compared with similar plants grown in like areas, not treated with the nutrient composition of this invention. The crops treated with the nutrient composition of this invention are noted to be healthier, produce a greater weight yield of fruits, to have healthy normal leaves indicating no deficiencies and to have a better and deeper root structure than the non-treated crops. In addition, some reports mentioned that the crops treated with the nutrient foliar application of this invention required only one-half the normal amount of water, probably because of the better developed root systems.

In another test seeds of tomatoes, soy beans, pinto beans and corn were treated with a dry seed treater composition comprising the dry nutrient composition prepared as described above. The seeds were intermixed with the dry ingredient. The seeds were planted, and during planting were given an application of seed bed starter which comprised the dry nutrient composition of this invention and water or nitrate solutions. Treated and non-treated seeds were planted and grown in identical soil. The treated seeds were found to germinate faster than the non-treated seeds. After 9 weeks the treated corn was found to have a deeper and more branching root structure and to have healthier appearing leaves and approximately 5% to 30% more foilage than the non-treated corn. In addition, the requirements of the treated plants were less. It was calculated that the treated corn would provide 2½ tons of sileage more per acre than the non-treated corn.

The treated and non-treated soybeans were examined after about 6 weeks of field growing condition. The treated beans were found to have more nitrogen nodules on the beans indicating a better nutritional condition; they were found to have a bushy, deep root structure and to be less susceptible to water starvation.

As is apparent from the foregoing description the nutrient composition of this invention can be used to prepare liquid foliar applications, dry seed treater application and in seedbed starter form.

We claim:

1. In a nutrient composition for animals and plants comprising a cultured natural whey product portion and a mineral mix portion, the particle size of said composition being less than 44 microns, the improvement comprising: that substantially all of the particles of said composition comprise a physically united composite created by particle collisions each of said composite particles having some portion of the whey product and some portion of the mineral mix portion present.

2. The composition of claim 1 wherein said whey product comprises from about 3% to about 30% of said composition.

3. The composition of claim 1 wherein said whey product comprises from about 3% to about 15% of said composition.

4. The composition of claim 1 wherein the mineral mix comprises from about 1% to about 97% of said composition.

5. The composition of claim 1 wherein the mineral mix comprises from about 3% to 25% of said composition.

6. The composition of claim 1 wherein the mineral mix comprises from 2% to 10% of said composition.

7. The composition of claim 1 wherein the cultured whey is milk whey which has been innoculated with lactobacillus organisms and fermented in the presence of cobalt ions.

8. The composition of claim 1 wherein the lactobacillus organism is *Lactobacillus bulgaricus*.

9. The composition of claim 7 wherein the lactobacillus organism is *Lactobacillus acidophilus*.

10. The composition of claim 7 wherein the source of cobalt ions is cobalt carbonate.

11. The composition of claim 7 wherein the source of cobalt ions is cobalt sulfate.

12. The composition of claim 7 wherein the source of cobalt ions is cobalt chloride.

13. The composition of claim 1 wherein the mineral mix is comprised of sources of trace minerals.

14. The composition of claim 13 wherein the trace mineral source are mineral salts.

15. The composition of claim 1 wherein the trace minerals are mineral salts selected from the group consisting of salts of copper, zinc, magnesium, iodine, manganese, boron, sodium, cobalt, aluminum, iron, molybdenum, and chromium.

16. The composition of claim 1 wherein the mineral mix comprises from about 1% to 15% of trace mineral sources, the balance of said mineral mix comprising clays, dispersants, wetting agents and surfactants or mixtures thereof.

17. The composition of claim 16 wherein said mineral mix contains an anionic dispersant capable of providing uniform anionic particle charges to the particles of said composition whereby said particles repel each other and are prevented from coalescing by means of electrical attraction.

18. The composition of claim 17 wherein the anionic dispersant comprises from about 0.1% to about 10% by weight of the mineral mix.

19. The composition of claim 18 wherein the anionic dispersant is a natural anionic dispersant.

20. The composition of claim 1 wherein the anionic dispersant is a synthetic dispersant.

21. The composition of claim 18 wherein the dispersant is a combination of natural and synthetic dispersants.

22. The composition of claim 21 wherein the natural dispersant is selected from calcium lignosulfonate and sodium lignosulfanate or mixtures thereof and the synthetic dispersant is selected from the group consisting of Petro-Sperse-P and Tamol or mixtures thereof.

23. The composition of claim 1 wherein the particle size is less than 20 microns.

24. The composition of claim 1 wherein the particle size is from 1 micron to 15 microns.

25. The composition of claim 1 wherein the particle size is less than 1 micron.

26. A process of making a nutrient composition for animals and plants, said composition comprising cultured milk whey innoculated with *Lactobacillus acidophilus* and fermented in the presence of cobalt ions, and mineral mix, the process comprising;
   a. mixing all of the dry ingredients of said composition;
   b. spraying the liquid whey product on said dry ingredients while still mixing;
   c. continuing said mixing until a uniform dry free flowing appearance is obtained; and
   d. particle-to-particle impact milling the product of (c) to obtain particles of a size less than 44 microns.

27. The process of claim 26 wherein said impact milling is fluid energy milling.

28. The process of claim 26 wherein said impact milling is air milling.

29. The process of claim 28 wherein said air milling is opposed jet air milling.

30. A dry seed treater nutrient composition comprising the composition of claim 1 in combination with primary and secondary fertilizers.

31. A seed bed starter nutrient composition comprising the composition of claim 1, in combination with primary and secondary fertilizers and a liquid carrier.

32. A foliar application comprising the composition of claim 1, in combination with primary and secondary fertilizers, slurried with a liquid carrier and thereby adapted to spray directly on the leaves of young plants.

33. The foliar application of claim 32 wherein the liquid carrier is water.

34. The foliar application of claim 32 wherein the liquid carrier is a nitrate solution.

35. A nutrient composition for animals and plants comprising from about 3% to about 15% milk whey innoculated with *Lactobacillus acidophilus* and fermented in the presence of cobalt ions, and from about 3% to about 25% of a mineral mix composition, said mineral mix comprising from about 1% to about 15% of mineral salts, from about 0.2% to about 10% of an anionic dispersant and the balance of said mineral mix comprising clay carriers, wetting agents and surfactants, the particles of said nutrient composition being less than 44 microns in size substantially all of the particles of said composition comprising a physically united composite created by particle collisions, each of said composite particles having some portion of the whey present and some portion of the mineral mix present.

* * * * *